G. W. WILLIS.
DISK HARROW.
APPLICATION FILED OCT. 29, 1914.
1,260,497.
Patented Mar. 26, 1918.
2 SHEETS—SHEET 1.
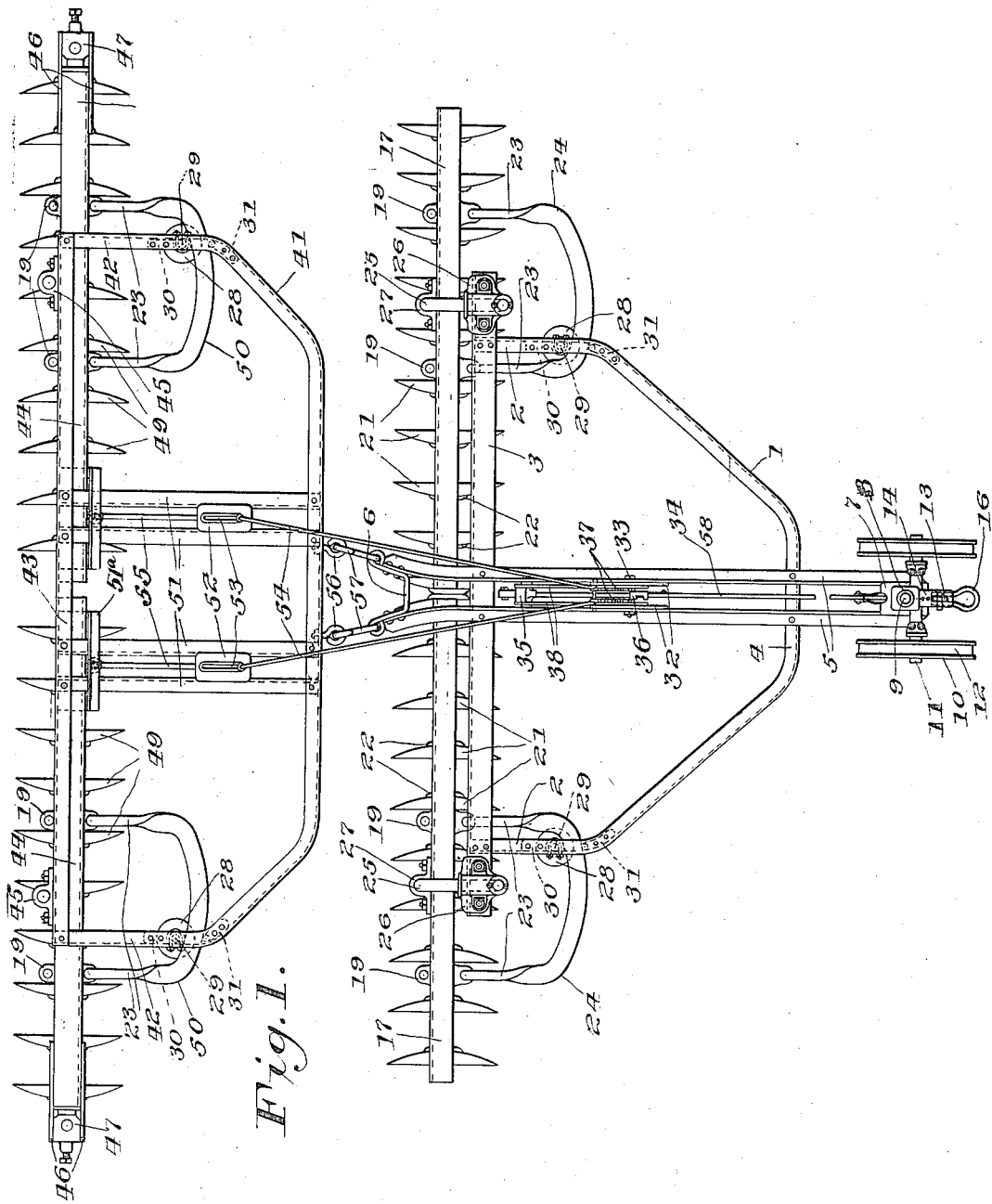
Witnesses:
C. C. Palmer.
E. W. Burgess
Inventor:
George W. Willis,
By Chas. E. Lord
Atty.

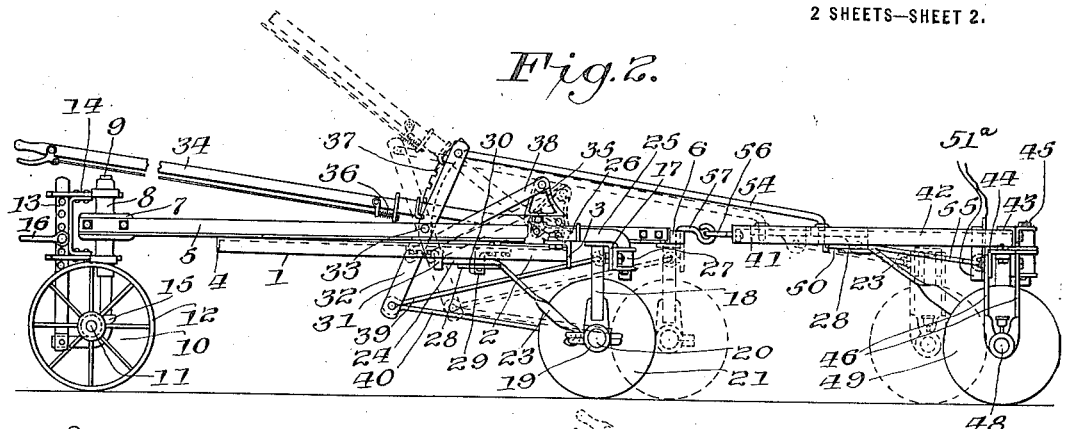
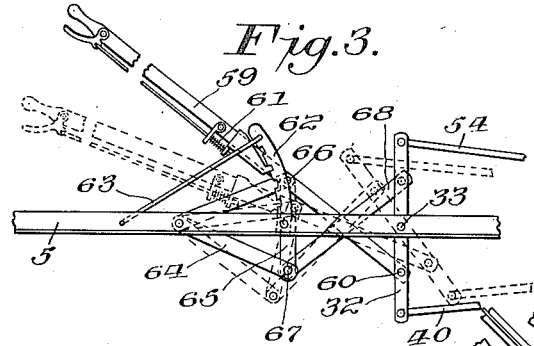
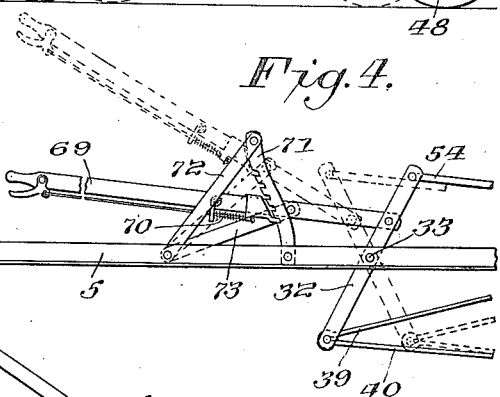
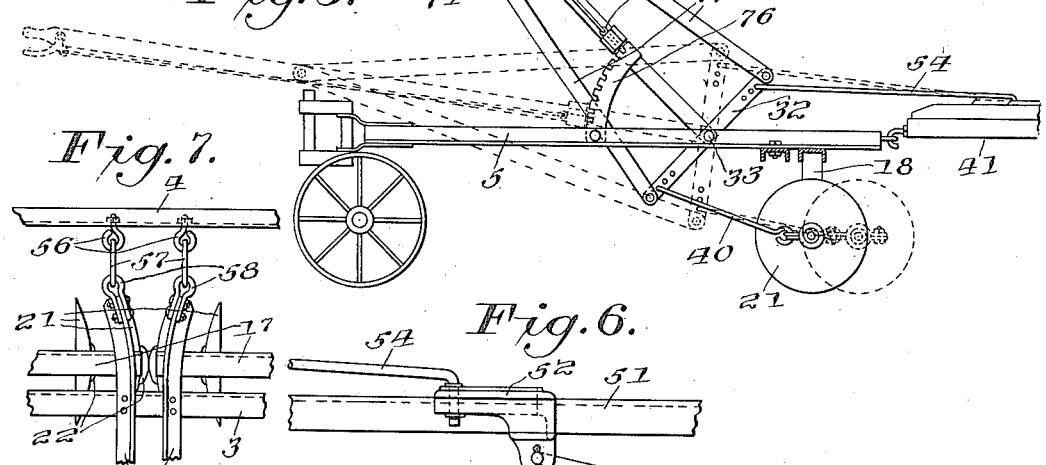
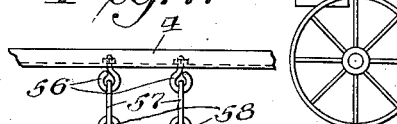
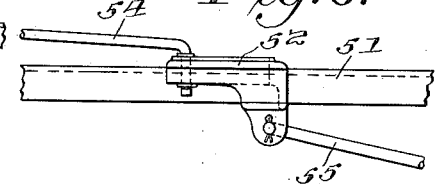

UNITED STATES PATENT OFFICE.

GEORGE W. WILLIS, OF AUBURN, NEW YORK, ASSIGNOR TO INTERNATIONAL HARVESTER COMPANY OF NEW JERSEY, A CORPORATION OF NEW JERSEY.

DISK HARROW.

1,260,497.     Specification of Letters Patent.     Patented Mar. 26, 1918.

Application filed October 29, 1914. Serial No. 869,202.

*To all whom it may concern:*

Be it known that I, GEORGE W. WILLIS, a citizen of the United States, residing at Auburn, in the county of Cayuga and State of New York, have invented certain new and useful Improvements in Disk Harrows, of which the following is a full, clear, and exact specification.

My invention relates to disk harrows, and in particular to that type wherein two complete harrows, having two disk gangs each, are operated in tandem relation and drawn by a traction engine, and consists in providing improved draft connections between the front and rear units, whereby, in operation, any tendency of the rear unit to move laterally relative to the front unit is effectually resisted, and improved means whereby the angle of the respective gangs relative to the line of draft of the machine may be simultaneously regulated by means of mechanism controlled by an operator from the platform of the tractor.

The object of my invention is to provide an implement of the character described that will be flexible in operation and readily adjustable as required, the mechanism permitting a turning movement at the end of the field, insuring a proper trailing effect at all times, and being always under complete control of an operator from the tractor platform. These objects are attained by means of mechanism, several embodiments of which are shown for purposes of illustration in the accompanying drawings, in which—

Figure 1 is a top plan view of a tandem disk harrow having my invention embodied in its construction;

Fig. 2 is a form of set lever mechanism carried by the front unit of the structure and operatively connected with the rear unit;

Fig. 3 is another form of set lever mechanism;

Fig. 4 is a modified form of Fig. 3;

Fig. 5 is another modified form of lever controlling mechanism;

Fig. 6 is a detached detail of the adjusting mechanism connecting the set lever mechanism with the disk gangs of the rear unit; and Fig. 7 is a detail view of a modified form of hitch for the rear harrow.

Referring to the drawings, wherein the same reference characters designate like parts throughout the several views, the draft frame of the front unit includes a substantially U-shaped member 1, having its rear ends 2 disposed parallel with the line of draft and secured to a transverse draft frame member 3, and its head portion 4 to longitudinally disposed frame members 5, spaced apart in parallel relation upon opposite sides of the center line of the frame, and having their rear ends secured to the transverse frame member 3. As shown these rear ends extend in rear of the frame member 3, and are curved laterally in opposite directions, the ends of the curved portions being connected by means of a double eyed bracket member 6. 7 represents a bracket member secured to the front ends of the frame members 5, having a vertically disposed bearing sleeve 8 integral therewith, in which is journaled the vertical stem 9 of a forecarriage 10, including an axle 11 connected with the lower end of the stem and having wheels 12 journaled upon its opposite ends. 13 represents a vertically disposed draft bar having its upper end secured to a two-armed bracket 14 carried by the stem 9, and its lower end attached to a forwardly protruding portion of the stem 9, which portion is in turn seated in a bracket 15 carried by the axle 11. 16 represents a draft clevis adjustable vertically upon the bar 13 and whereby the harrow may be connected with a tractor or other source of tractive power.

The gang frames include transversely disposed frame members 17, preferably having the upper ends of depending bars 18 secured thereto, the lower ends of the bars being secured to bearing boxes 19, in which are journaled the gang axles 20 carrying the disks 21, spaced apart by means of spools 22 in a well-known way; the gangs of the front unit being operative as an inthrow harrow, and the harrow gangs being adjustable to assume a rearwardly converging angle. There are three bearing boxes for the axles of each gang, one at their inner ends and two spaced apart near the opposite ends of the axle; the two outside bearings of the front unit being connected to the rear ends of side members 23 of U-shaped draft members 24, the front portions of which are formed concentric with the vertical axes of rearwardly extending links 25 having their front ends pivotally connected with bracket members 26 secured to the draft frame member 3, and their rear ends turned downward and pivotally received by bearing blocks 27 secured to the main frame members 17 of the gang frame in a manner permitting an angular adjustment of the disk gangs relative to the line of draft.

The head portions of the U-shaped draft members 24 engage with flanged wheels 28 journaled upon depending stem portions 29, forming part of bracket members 30 secured to the draft frame members 2; the construction permitting an easy adjustment of the gangs angularly, and 31 represents downwardly extending bracket members that are also secured to the frame members 2 and engage with the front sides of the head portions of the U-shaped draft members 24 in a manner to retain them in proper engagement with the flanged wheels 28.

32 represents a rocking evener pivoted at 33 intermediate its ends between the longitudinally disposed frame members 5 of the draft frame. This evener is actuated by lever mechanism which is adapted to be operated from a leading machine, as a tractor, and is so disposed as to be readily operated by a man on the rear platform of such a machine. In Figs. 1 and 2 I have shown a forwardly and upwardly extending hand lever 34 having its rear end rigidly connected to an upstanding bracket 35, suitably mounted between members 5, and provided with spring detent mechanism 36, coöperating with upstanding sectors 37 fixed to the frame 5 at points in front of the bracket 35. As shown, this bracket 35 is connected to the evener 32 at a point below its pivot by forwardly and downwardly extending links 38, and the evener 32 is connected at its lower end through links 39 and 40 with the inner end of the front gang members. The upper end of the evener 32 is operatively connected to the rear gang members carried upon the frame of the rear harrow, as hereinafter described.

This rear harrow includes a draft frame comprising a U-shaped member 41 having parallel and rearwardly extending parts 42 secured to the opposite ends of a transverse draft frame 43. The disk gangs of this rear unit include rear frame members 44, which are pivotally connected to the opposite ends of the frame member 43 by means of the couplings 45, permitting the gangs to be adjusted angularly relative to the line of draft. 46 represents depending gang frame members having their upper ends secured to the frame members 44 and their lower ends to bearing boxes 47, like in form and position to those of the front unit; the gang axles 48 being journaled in the bearings and carrying disks 49 adapted to throw the soil inward, and adjustable in a rearwardly diverging angle as contrasted to the opposite adjustment of the front gangs. 50 represents U-shaped draft members like in form to the draft members 24 of the front unit, and connecting the rear disk gangs with the members 42 in a like manner.

51 represents two pairs of longitudinally disposed bars secured to the rear draft frame in parallel relation, and arranged as guides for blocks 52, which are slidably received between each pair of bars and provided with longitudinally arranged slots 53 which in turn receive the rear ends of adjusting rods 54 having their front ends adjustably connected to the upper end of the evener 32 hereinabove referr'd to. As shown in Fig. 6, 55 represents links connecting downwardly extending ear members integral with the blocks with the inner ends of the rear gang frames, whereby the gangs may be adjusted angularly relative to the line of draft, as above indicated. It is to be noted that through this slotted block construction all buckling of the rods 54 is effectually prevented, the rear ends of the same when necessary being free to move in the slots in the blocks 52. It is to be noted also that loop or link members 51$^a$ pass over the upper sides of bars 51 and have their depending portions connected to the inner ends of the rear disk gang members 44 for vertically supporting and carrying the inner ends of said disk gang members on the rear section in a common horizontal plane in their respective shifted and unshifted positions.

The draft connections between the front and rear units of the harrow comprise eye-bolts 56 secured to the draft frame member 41, and spaced apart laterally on opposite sides of and adjacent to the median line of the rear harrow. These eye-bolts are connected with eyes formed on the rearwardly protruding ends of the double eyed bracket member 6 by means of a double eyed or hook and eye links 57 in such a manner that while the rear unit is flexibly connected to the front unit it is restrained from lateral displacement in operation and permitted a free turning movement at the end of the field. In Fig. 7 I have illustrated a modified form of this hitch for the rear harrow. In this construction it is to be noted that instead of providing a single member 6 having integral eyes thereon which receive the links 57, separate substantially U-shaped attaching clips 58 are bolted on the rearwardly extending ends of the front frame members 5. These links 57 are nine inches or more apart on their centers, and whenever the rear unit of the harrow shows a tendency to draw back on one side more than the other, it throws the draft of the rear unit on the link located on the heavier draft side of the harrow. This being off the center of the pull, will have a tendency to make the harrow straighten up.

In Fig. 3 I have illustrated a modified form of the hand lever mechanism shown in Figs. 1 and 2. This mechanism includes a hand lever 59 having its rear end pivotally connected at 60 with the evener member 32. Upon this hand lever a spring detent 61 is carried, which operatively engages with reversely curved, upstanding, tooth sectors 62 secured to the frame members 5, and braced thereon by braces 63. As shown, the lever 59 is also connected to the evener 32 through links 64 pivoted at their front ends to the frame members 5 and at their rear ends to upstanding spacing members 65, which are in turn pivoted at their upper ends to the lever 59 at 66, and at their lower ends are pivoted at 67 to rearwardly and upwardly extending links 68 pivoted to the evener 32 at points above the pivots of the latter.

In the form of lever mechanism shown in Fig. 4, 69 represents a hand lever having its rear end pivotally connected with the evener member 32 at a point above its pivot. This lever is provided with a spring pressed sliding detent 70 which operatively engages cam-shaped tooth sectors 71 secured to the draft frame members 5 and braced thereon by braces 72. In this construction a link 73 is also pivotally connected to the frame at a point preferably registering with the point of connection of the brace 72, and this link is free to swing upward, and is connected to the lever 69 at a point between the ends of the latter and preferably slightly in rear of the sectors 71.

In the form of lever mechanism shown in Fig. 5, 74 represents a hand lever having its rear end secured to the pivot of the evener 32. This lever carries a spring detent 75 which engages with sectors 76 secured to the draft frame members 5. As shown, the lever is also provided with coöperating members 77 having their front ends attached to it at a point in front of the sectors, and their rear ends connected to the ends of the evener 32.

In all of these constructions it is to be understood that if the operator desires to vary the angle of the disk gangs with respect to the line of draft he may do so by raising or lowering the hand lever, the gangs on the front harrow always being adjusted simultaneously with the gangs on the rear harrow but in an opposite direction to the direction of movement of the latter gangs. Attention is further directed to the fact that through the improved lever mechanism the angle of the gangs may be very quickly adjusted so that the operator upon the tractor is enabled to exercise a complete control over the harrow as it moves about a turn or as it is drawn along the field. It is of course obvious that if desired the operator may operate only one harrow, the rear harrow being disconnectible at will.

While I have shown and described various modifications of my invention, it is to be understood that it is capable of many more modifications. Changes, therefore, in the construction and arrangement may be made without departing from the spirit and scope of the invention as disclosed in the appended claims.

I claim—

1. In a tandem harrow, operatively connected front and rear harrow frames, tillage units carried by said frames and adjustable with respect to the line of draft, an evener supported in advance of and being operatively connected to said tillage units, and means for operating said evener for changing the angularity of said tillage units.

2. In a tandem harrow, operatively connected front and rear harrow frames, tillage units carried by said frames and adjustable with respect to the line of draft, an evener carried entirely on one of said frames operatively connected to said tillage units, and control means for operating said evener for simultaneously adjusting all tillage units.

3. In a tandem harrow, front and rear harrow frames operatively connected together, a plurality of tilling units carried on each of said frames and adjustable with respect to the line of draft, an operating lever carried on one of said frames, an evener journaled on said frame, operative connections connecting the units of said front and rear harrows with opposite ends of said evener and a connecting member between said lever and said evener whereby upon movement of said lever said evener and harrow units are simultaneously adjusted.

4. In a disk harrow, the combination with a front draft frame having two separate disk carrying shafts adjustable to assume a rearwardly converging angle, harrow disks carried by said shafts, of a separate rear draft frame having two separate disk carrying shafts adjustable to assume a rearwardly diverging angle, harrow disks carried by said shafts, draft connections between the two frames, and a lever mechanism including an evener carried by the front draft frame and operatively connected with the disk carrying shafts of both frames whereby they may be adjusted angularly relative to the line of draft.

5. In a disk harrow, the combination with a front draft frame having two separate disk carrying shafts adjustable to assume a rearwardly converging angle, harrow disks carried by said shafts, of a separate rear draft frame having two separate disk carrying shafts adjustable to assume a rearwardly diverging angle, harrow disks carried by said shafts, draft connections between the two frames, and a lever mechanism including an evener carried by the front draft frame in advance of the disk carrying shafts and operatively connected with the disk carrying shafts of both frames whereby they may be adjusted angularly in opposite directions relative to the line of draft.

6. In a disk harrow, the combination with a front draft frame having two separate disk carrying shafts adjustable to assume a rearwardly converging angle, harrow disks carried by said shafts, of a separate rear draft frame having two separate disk carrying shafts adjustable to assume a rearwardly diverging angle, harrow disks carried by said shafts, draft connections between the two frames, said draft connections including separate flexible draft members each wholly on one side of the longitudinal median line and connecting the rear side of the front draft frame with the front side of the rear draft frame upon opposite sides of the longitudinal center of said frame, and lever controlled evener means for adjusting said disk carrying shafts angularly in opposite directions.

7. In a disk harrow, the combination with a front draft frame having two separate disk carrying shafts adjustable to assume a rearwardly converging angle, harrow disks carried by said shafts, of a separate rear draft frame having two separate disk carrying shafts adjustable to assume a rearwardly diverging angle, harrow disks carried by said shafts, draft connections between the two frames, and a hand lever mechanism including a separate evener carried by the front draft frame and operatively connected with said disk carrying shafts whereby the shafts carried by the front and rear draft frames may be adjusted angularly in opposite directions.

8. In a disk harrow, the combination with a front draft frame having two separate disk carrying shafts adjustable to assume a rearwardly converging angle, harrow disks carried by said shafts, of a separate rear draft frame having two separate disk carrying shafts adjustable to assume a rearwardly diverging angle, harrow disks carried by said shafts, draft connections between the two frames, and a single hand lever mechanism including a separate evener carried by the front draft frame in advance of the disk carrying shafts and operatively connected with said disk carrying shafts whereby the shafts carried by the front and rear draft frames may be adjusted angularly in opposite directions.

9. In a disk harrow, the combination with a front draft frame having two separate disk carrying shafts adjustable to assume a rearwardly converging angle, harrow disks carried by said shafts, of a separate rear draft frame having two separate disk carrying shafts adjustable to assume a rearwardly diverging angle, harrow disks carried by said shafts, draft connections between the two frames, lever mechanism carried by the front draft frame and including evener members pivotally connected intermediate their ends with the front draft frame and having one end thereof connected with the front disk carrying shafts and their opposite ends with the rear disk carrying shafts, and a hand lever operatively connected with said eveners.

10. In a disk harrow, the combination of a front draft frame including centrally disposed longitudinal frame members spaced apart, having two separate disk carrying shafts adjustable to assume rearwardly converging angles, harrow disks carried by said shafts, of a rear draft frame including two pairs of longitudinally disposed frame members spaced apart, having two separate disk carrying shafts adjustable to assume a rearwardly diverging angle, harrow disks carried by said shafts, an adjusting lever mechanism carried by the front draft frame and including evener members pivoted intermediate their ends between said longitudinal frame members, slidable blocks carried between each pair of said longitudinal frame members, link connections between said blocks and one end of said eveners and between the said blocks and the rear disk carrying shafts, link connections between said eveners and said front disk carrying shafts, and a hand lever carried by said front draft frame and operatively connected with said eveners.

11. In a disk harrow, the combination of a front draft frame including centrally disposed longitudinal frame members spaced apart, having two separate disk carrying shafts adjustable to assume a rearwardly converging angle, harrow disks carried by said shafts, of a rear draft frame including two pairs of longitudinally disposed frame members spaced apart and having two separate disk carrying shafts adjustable to assume a rearwardly diverging angle, harrow disks carried by said shafts, an adjusting lever mechanism carried by the front draft frame and including evener members pivoted intermediate their ends between said longitudinal frame members, slidable blocks carried between each pair of said longitudinal frame members, said blocks having longitudinally disposed slots and depending ear members, links having their rear ends received by the slots in said blocks and their front ends connected with one end of said eveners, links connecting said ear members with the rear disk carrying shafts, and link connections between the opposite ends of said eveners and the front disk carrying axles, and a hand lever carried by the front draft frame and operatively connected with said eveners.

12. In a disk harrow, in combination, a front draft frame including longitudinally disposed members spaced apart upon opposite sides of the center line of the frame and diverging rearward at their rear ends and having a double eyed bracket secured thereto, a rear draft frame, flexible connections between said rear draft frame and said double eyed bracket, disk carrying shafts carried by said front frame and adjustable to assume a rearwardly converging angle, and disk carrying shafts carried by said rear frame and adjustable to assume a rearwardly diverging angle.

13. In a double disk harrow, the combination with front and rear harrow frames provided with adjustably mounted disk gangs, of forwardly converging draft links flexibly connected at their opposite ends to said front and rear harrow frames at points equally distant from the common longitudinal centers of said frames.

14. In a double disk harrow, the combination of a front frame and a rear frame each carrying earth working devices, links connected to one of said frames at opposite sides of the line of draft and equally spaced therefrom, said links being pivotally connected to the other of said frames at a less distance from said line of draft than at the opposite ends to permit said frames to swing toward each other in varying relative angular relation on said arms.

15. A double disk harrow comprising front and rear harrow sections, draft links connected at their opposite ends to said front and rear harrow sections at points equally distant from the common longitudinal centers thereof, respectively, the connections between the front ends of said draft links and said front harrow section being horizontally flexible and spaced from each other a less distance than on the rear harrow section to permit said draft bars and rear harrow section to move laterally to one side or the other in a common horizontal plane and in varying angles relative to each other and to said front harrow section.

16. In a double disk harrow, front and rear harrow frames, gang frames carried thereby, and draft members flexibly connected to said rear harrow frame and extending in a forwardly converging angle and flexibly connected at their front ends to said front harrow frame at points equally distant from the line of draft.

17. In a double disk harrow, the combination with front and rear harrow frames provided with adjustably mounted disk gangs, of forwardly converging draft members flexibly connected at their opposite ends to said front and rear harrow frames at points equally distant from the common longitudinal centers of said frames.

18. In a double disk harrow, the combination of front and rear harrow frames provided with adjustable disk gangs, and independently mounted forwardly converging draft members flexibly connected to said front and rear frames and normally extending at equal angles to the longitudinal center of said harrow, and means for vertically supporting said rear disk gangs in their various adjusted positions relative to said rear harrow frame.

19. A tandem harrow comprising a front section and a rear section, draft members connected to said sections at points equally distant on each side of the line of draft, respectively, said draft members being pivotally connected at their ends to one of said sections at less distance from each other than the opposite ends on the other section to permit said draft members and said sections to swing in horizontal planes toward and from each other in varying relative angular relation.

20. In a double disk harrow, the combination of a front frame and a rear frame each carrying earth working devices, draft members connected to one of said frames at opposite sides of the line of draft and equally spaced therefrom, said draft members being pivotally connected to the other of said frames at a less distance from said line of draft than at the opposite ends to permit said frames to swing toward each other in varying relative angular relation on said draft members.

21. A tandem harrow comprising a front section and a rear section, and forwardly converging draft members connected at their opposite ends to said front and rear sections at points equally distant from the line of draft of said sections, respectively, said draft members each having a horizontally swinging pivotal connection with the front section to permit said section and draft members to swing laterally in a substantially horizontal plane in varying relative angular relation to each other and to said front section.

22. In a double disk harrow, the combination of a front section and a rear section each including longitudinally adjustable disk gangs, draft members connecting said sections at each side of the line of draft, said draft members each having a horizontal pivotal connection with one of said sections to permit said last mentioned section to swing toward the other section on said connections, said pivotal connections being spaced apart a less distance from each other and from said line of draft than the connections at the opposite ends of said draft members, and means for vertically supporting and carrying the inner ends of said disk gangs on said rear section in a common horizontal plane in their respective shifted and unshifted positions.

23. In a double disk harrow, the combination with a front section and a rear section, of draft members connected to said rear section and flexibly connected horizontally to said front section to swing in a horizontal plane relative to said front section and at varying angles thereto, said points of connection between the ends of said draft members and the front and rear sections, respectively, being equally distant on opposite sides of the line of draft and said flexible connections on said front section being spaced from each other a less distance than the connections of said draft members of said rear section.

24. A double disk harrow comprising front and rear harrow sections, draft members connected at their opposite ends to said front and rear harrow sections at points equally distant from the common longitudinal centers thereof, respectively, the connections between the front ends of said draft members and said front harrow section being horizontally flexible and spaced from each other a less distance than on the rear harrow section to permit said draft members and rear harrow section to move laterally to one side or the other in a common horizontal plane and in varying angles relative to each other and to said front harrow section.

25. In a double disk harrow, the combination of a front harrow section, a rear harrow section provided with draft members connected to said front harrow section at points equally distant from the line of draft, said connections on said front harrow section being spaced from each other at a less distance than the connections of said draft members on said rear section, and link members between said rear harrow section and the inner ends of the disk gangs carried thereby for vertically supporting the latter in a common horizontal plane in their various adjusted positions.

26. In a double disk harrow, the combination with front and rear harrow sections each including horizontally adjustable disk gangs vertically pivoted at points equally distant from the line of draft, draft members connected to said front and rear harrow sections at points equally distant from the line of draft, respectively, the connections between the front ends of said draft members and said front harrow section being horizontally flexible and spaced from each other at a less distance than on the rear harrow section, and means on said rear harrow section for vertically supporting and carrying the inner ends of said disk gangs in a common horizontal plane in their various adjusted positions thereon.

27. In a double disk harrow, the combination of front and rear harrow sections, each including horizontally adjustable vertically pivoted disk gangs, draft members connected to said rear section and flexibly connected horizontally to said front section to swing in a horizontal plane at varying relative angles thereto and to each other, said connections on said front section being spaced from each other a less distance than their connections to said rear section, and the points of connection on each section being equally distant on each side of the line of draft, respectively, and means on said rear section for vertically supporting said rear disk gangs in a common horizontal plane in their various adjusted positions.

28. In a double disk harrow, front and rear harrow frames, disk gangs carried thereby, and forwardly converging coupling elements flexibly connecting said front and rear frames.

29. In a double disk harrow, front and rear harrow frames, disk gangs carried thereby, and forwardly converging rigid coupling elements pivotally connected to both front and rear frames.

In testimony whereof I affix my signature, in the presence of two witnesses.

GEORGE W. WILLIS.

Witnesses:
L. RÖLL,
CHR. ERFURT.